(12) United States Patent
Imamura (10) Patent No.: US 10,442,189 B2
(45) Date of Patent: Oct. 15, 2019

(54) PRINTING APPARATUS, METHOD FOR CONTROLLING PRINTING APPARATUS, AND RECORDING MEDIUM

(71) Applicant: CANON KABUSHIKI KAISHA, Tokyo (JP)

(72) Inventor: Takeru Imamura, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/826,615

(22) Filed: Aug. 14, 2015

(65) Prior Publication Data

US 2016/0052260 A1 Feb. 25, 2016

(30) Foreign Application Priority Data

Aug. 19, 2014 (JP) ................. 2014-166680

(51) Int. Cl.
| | | |
|---|---|---|
| *B41J 2/045* | (2006.01) | |
| *G03G 21/20* | (2006.01) | |
| *G06F 1/3231* | (2019.01) | |
| *G03G 15/00* | (2006.01) | |
| *G06F 1/3206* | (2019.01) | |

(52) U.S. Cl.
CPC ....... *B41J 2/04551* (2013.01); *B41J 2/04501* (2013.01); *B41J 2/04586* (2013.01); *G03G 15/5004* (2013.01); *G03G 21/20* (2013.01); *G06F 1/3206* (2013.01); *G06F 1/3231* (2013.01); *Y02D 10/173* (2018.01)

(58) Field of Classification Search
USPC ...................................... 358/1.13
See application file for complete search history.

(56) References Cited

U.S. PATENT DOCUMENTS

| | | | |
|---|---|---|---|
| 6,384,414 B1 * | 5/2002 | Fisher ............... | G01J 5/08 250/339.05 |
| 6,650,322 B2 * | 11/2003 | Dai ................... | G06F 1/3203 345/212 |
| 8,282,274 B2 * | 10/2012 | Pang ................. | A61B 5/015 374/120 |
| 8,768,196 B2 * | 7/2014 | Baba ................. | G03G 15/5004 358/1.15 |

(Continued)

FOREIGN PATENT DOCUMENTS

| | | |
|---|---|---|
| CN | 102326133 A | 1/2012 |
| CN | 103308177 A | 9/2013 |

(Continued)

*Primary Examiner* — Shelby L Fidler
(74) *Attorney, Agent, or Firm* — Canon U.S.A. Inc., IP Division (57) ABSTRACT

A printing apparatus having a first power state and a second power state, which saves more power than the first power state, includes a detection unit configured to detect a temperature around the printing apparatus, a holding unit configured to hold background temperature data indicating the temperature around the printing apparatus, a control unit configured to, based on the background temperature data held in the holding unit and temperature data detected by the detection unit, shift the printing apparatus from the second power state to the first power state, and an update unit configured to update the background temperature data held in the holding unit.

17 Claims, 10 Drawing Sheets

(56) References Cited

U.S. PATENT DOCUMENTS

| | | | |
|---|---|---|---|
| 8,772,722 B2* | 7/2014 | Noguchi | G01J 5/0022 250/338.3 |
| 9,116,484 B2* | 8/2015 | Masumoto | G03G 15/5016 |
| 2002/0080132 A1* | 6/2002 | Dai | G06F 1/3203 345/212 |
| 2010/0329301 A1* | 12/2010 | Pang | A61B 5/015 374/121 |
| 2011/0155913 A1* | 6/2011 | Noguchi | G01J 5/0022 250/338.3 |
| 2012/0328319 A1* | 12/2012 | Ogata | G03G 15/5016 399/75 |
| 2014/0063528 A1 | 3/2014 | Hirose | |
| 2014/0064774 A1 | 3/2014 | Masumoto et al. | |
| 2014/0140716 A1* | 5/2014 | Ogata | G03G 15/5016 399/81 |
| 2014/0153013 A1 | 6/2014 | Imamura | |
| 2014/0157031 A1 | 6/2014 | Aoyagi | |
| 2014/0160505 A1* | 6/2014 | Tachikawa | H04N 1/00891 358/1.13 |
| 2015/0130933 A1* | 5/2015 | Breuer | H04N 5/33 348/143 |

FOREIGN PATENT DOCUMENTS

| | | |
|---|---|---|
| CN | 103415788 A | 11/2013 |
| CN | 103685818 A | 3/2014 |
| CN | 103856666 A | 6/2014 |
| JP | 2005-084631 A | 3/2005 |
| JP | 2012-020864 A | 2/2012 |
| JP | 2012-58645 A | 3/2012 |
| JP | 2013-044881 A | 3/2013 |
| JP | 2014-052495 A | 3/2014 |
| JP | 2014-110017 A | 6/2014 |

\* cited by examiner

BACKGROUND
TEMPERATURE DATA

FIG.7B

ACQUIRED
TEMPERATURE DATA

FIG.7C

PREVIOUSLY ACQUIRED
TEMPERATURE DATA

FIG.7D

UPDATED BACKGROUND
TEMPERATURE DATA

FIG.9A
PARTICULAR AREA

FIG.9B
BACKGROUND TEMPERATURE DATA

FIG.9C
ACQUIRED TEMPERATURE DATA

FIG.9D
PREVIOUSLY ACQUIRED TEMPERATURE DATA

FIG.9E
UPDATED BACKGROUND TEMPERATURE DATA

PRINTING APPARATUS, METHOD FOR CONTROLLING PRINTING APPARATUS, AND RECORDING MEDIUM

BACKGROUND OF THE INVENTION

Field of the Invention

The present invention relates to a printing apparatus, a method for controlling a printing apparatus, and a recording medium.

Description of the Related Art

A printing apparatus including a human sensor for detecting a person is known (see Japanese Patent Application Laid-Open No. 2012-58645). In such a printing apparatus, the human sensor provided in the printing apparatus determines whether a person approaches the printing apparatus, thereby causing the printing apparatus to return from a power saving state to a standby state. The printing apparatus returns to the standby state before a user arrives in front of the printing apparatus, thereby enabling the user to operate the printing apparatus without waiting in front of the printing apparatus.

Japanese Patent Application Laid-Open No. 2012-58645 discusses an example where an infrared sensor for detecting heat (infrared light) emitted from a person is used as the human sensor. Japanese Patent Application Laid-Open No. 2012-58645, however, does not at all mention that the infrared sensor is influenced by the temperature around the printing apparatus (e.g., the incidence of sunlight by opening a curtain, the lighting of a fluorescent light, and the turning on of an electronic device such as a personal computer).

The infrared sensor discussed in Japanese Patent Application Laid-Open No. 2012-58645, however, detects not only the heat of a user to be detected, but also the heat of a window and a wall, which are influenced by outside air, the heat of an illumination device such as a fluorescent light, and the heat of an electronic device such as a personal computer. This prevents the infrared sensor from accurately detecting a user of the printing apparatus that is to be detected. Further, the temperatures of the above window, wall, illumination device, and electronic device change every moment. Thus, it is very difficult to accurately detect the user of the printing apparatus, taking into account the influence of the heat of these.

SUMMARY OF THE INVENTION

The present invention is directed to an apparatus capable of preventing erroneous detection caused by the influence of heat around the apparatus and accurately detecting a user of the apparatus.

According to an aspect of the present invention, a printing apparatus having a first power state and a second power state, which saves more power than the first power state, includes a detection unit configured to detect a temperature around the printing apparatus, a holding unit configured to hold background temperature data indicating the temperature around the printing apparatus, a control unit configured to, based on the background temperature data held in the holding unit and temperature data detected by the detection unit, shift the printing apparatus from the second power state to the first power state, and an update unit configured to update the background temperature data held in the holding unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

<Description of System Configuration>

Figure 1A:
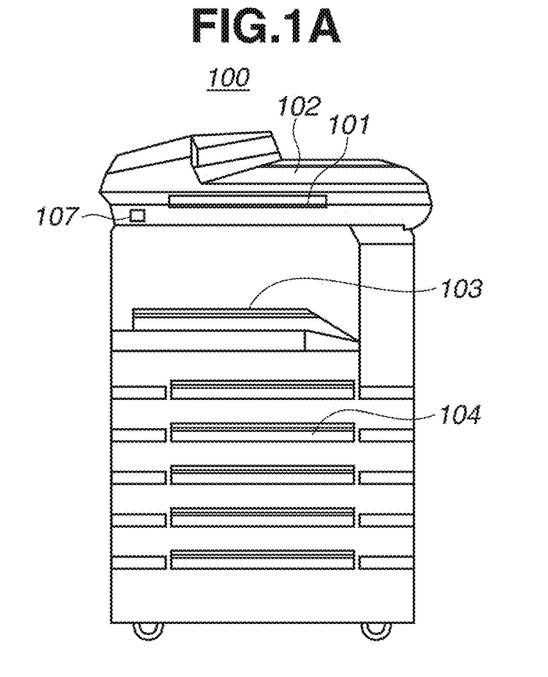
FIGS. 1A and 1B are diagrams illustrating an entirety of a printing apparatus.
Figure 1B:
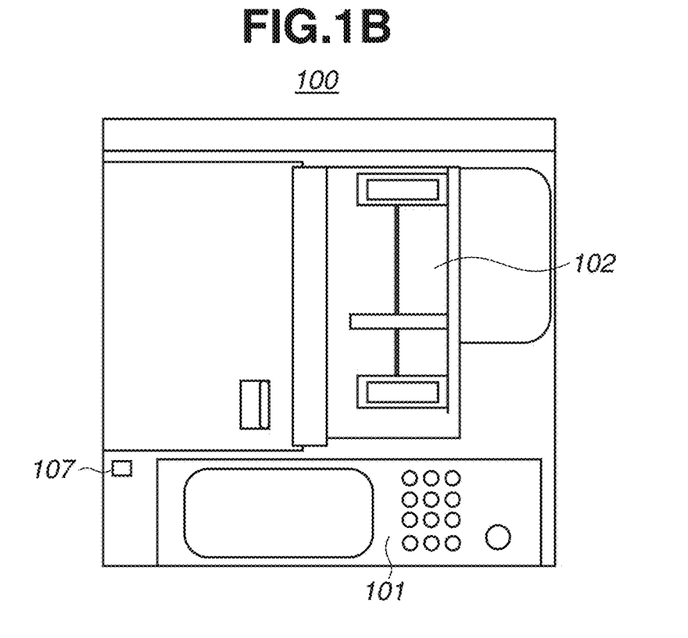

FIGS. 1A and 1B are diagrams illustrating the entirety of a printing apparatus 100 according to an exemplary embodiment of the present invention.

FIG. 1A is a front view of the printing apparatus 100. FIG. 1B is a plan view of the printing apparatus 100.

Examples of the printing apparatus 100 include a multifunction peripheral having a plurality of functions (a print function, a scanner function, a copy function, and a fax function), a facsimile apparatus, and a scanner apparatus. Further, in the present exemplary embodiment, although not particularly illustrated, the printing apparatus 100 is installed in an environment where heat sources such as a personal computer (PC), illumination, and heating are also placed around the printing apparatus 100.

In FIGS. 1A and 1B, the printing apparatus 100 includes, for example, an operation unit 101, a scanner unit 102, an inner finisher 103, and a sheet feeding cassette 104. The printing apparatus 100 according to the present exemplary embodiment has copy, print, fax, and scan functions.

The printing apparatus 100 shifts to a plurality of power states including at least a standby state (a first power state) and a power saving state (a second power state), which is lower in power consumption than the standby state. The standby state is a state where all the copy, print, fax, and scan functions can be performed. The power saving state is a state from which, if a return trigger is detected, the printing apparatus 100 can shift to the standby state. In the power saving state, power is supplied to portions for detecting the return trigger. Examples of the return trigger include the pressing of a power saving key 214 to be described below, the reception of a wake-up request packet from an external apparatus, and the detection of a person by a human sensor 107 to be described below. Further, in the power saving state, power is not supplied to functional units for performing the above functions (a printer unit 216 and the scanner unit 102). As illustrated in FIGS. 1A and 1B, the human sensor 107 is provided on the front side of the printing apparatus 100, and this human sensor 107 operates in the power saving state.

Figure 2:
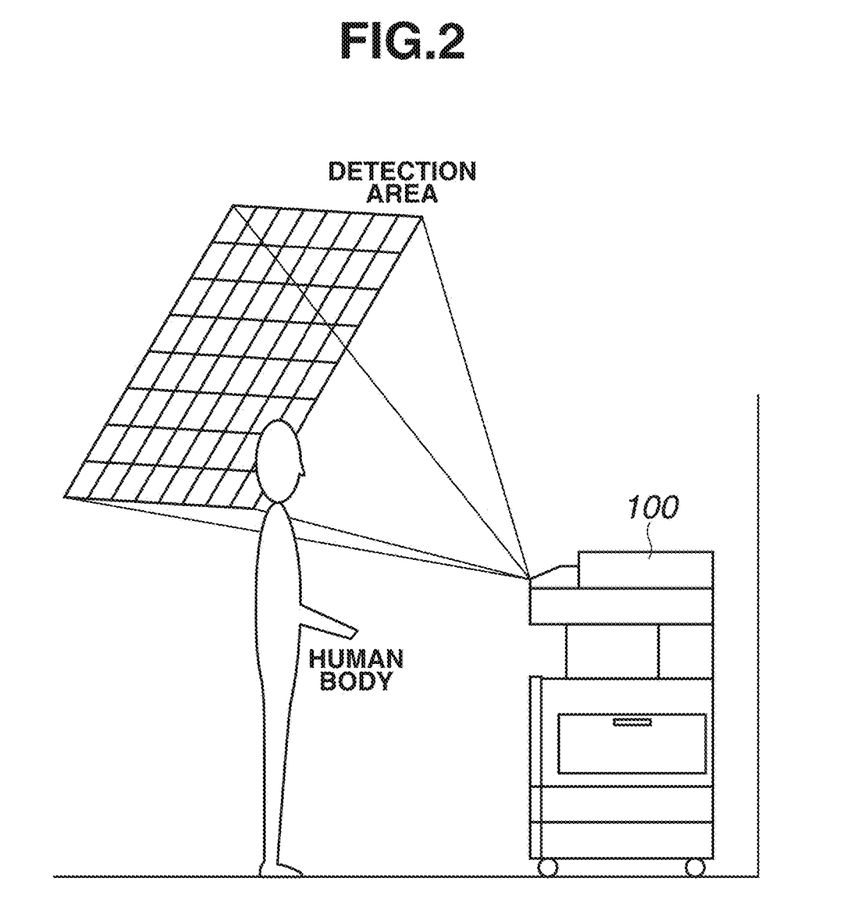
FIG. 2 is a diagram illustrating a detection range of a human sensor.

FIG. 2 is a diagram illustrating an example of the detection range of the human sensor 107 illustrated in FIGS. 1A and 1B.

The human sensor 107 according to the present exemplary embodiment is an infrared array sensor in which elements for receiving infrared light are arranged in a grid. The infrared array sensor may be an active sensor (an infrared transmission/reception sensor) for emitting infrared light and receiving the reflection of the infrared light, or may be a passive sensor (an infrared reception sensor) for receiving infrared light radiated from a person.

The human sensor 107 according to the present exemplary embodiment is described using a passive sensor. To detect as little of the heat sources on a floor and a desk that are placed around the printing apparatus 100 as possible, the human sensor 107 is placed facing obliquely upward as illustrated in FIG. 2 as an example. Thus, if a person approaches the printing apparatus 100 from far away, elements on the lower side of the human sensor 107 detect the heat of the person. The human sensor 107 is not limited to a sensor in which elements for receiving infrared light are arranged in a grid. Alternatively, the human sensor 107 may be a type of sensor in which the elements are arranged on a line. Yet alternatively, the elements may be arranged in another form.

Figure 3A:
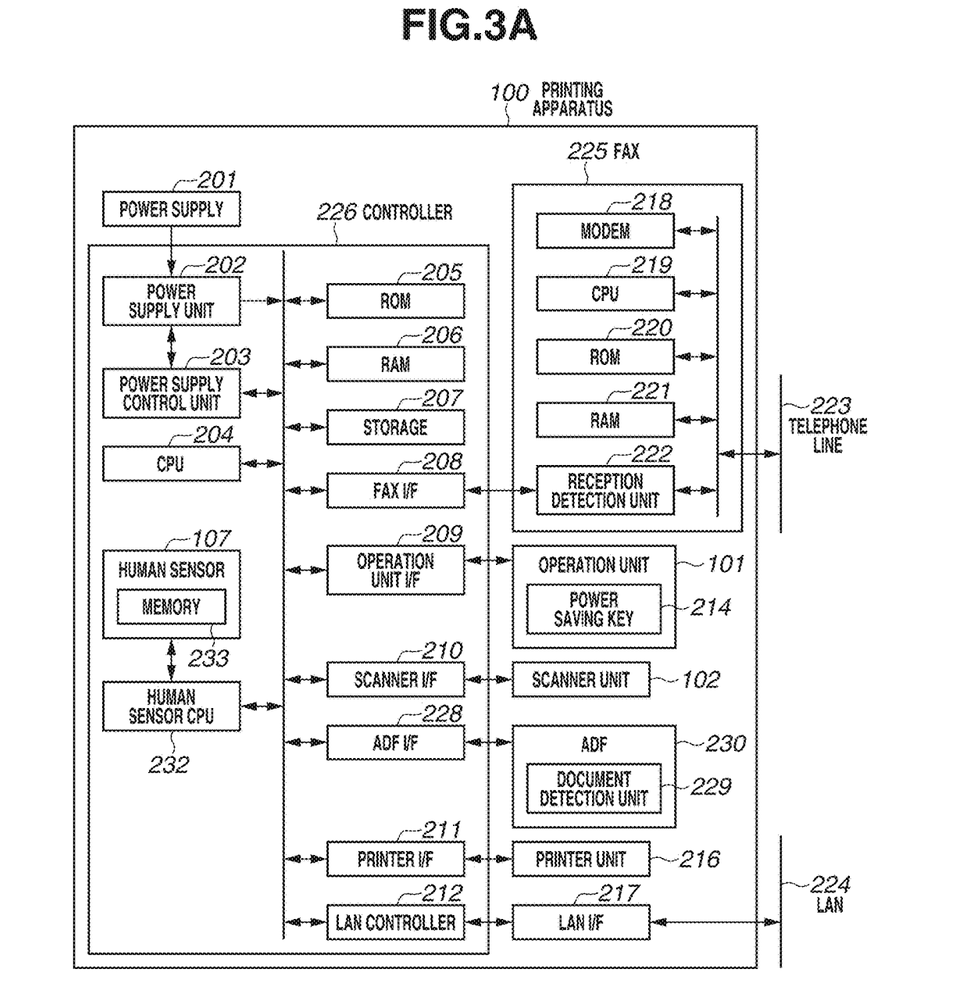
FIGS. 3A and 3B are block diagrams illustrating a hardware configuration of the printing apparatus.
Figure 3B:
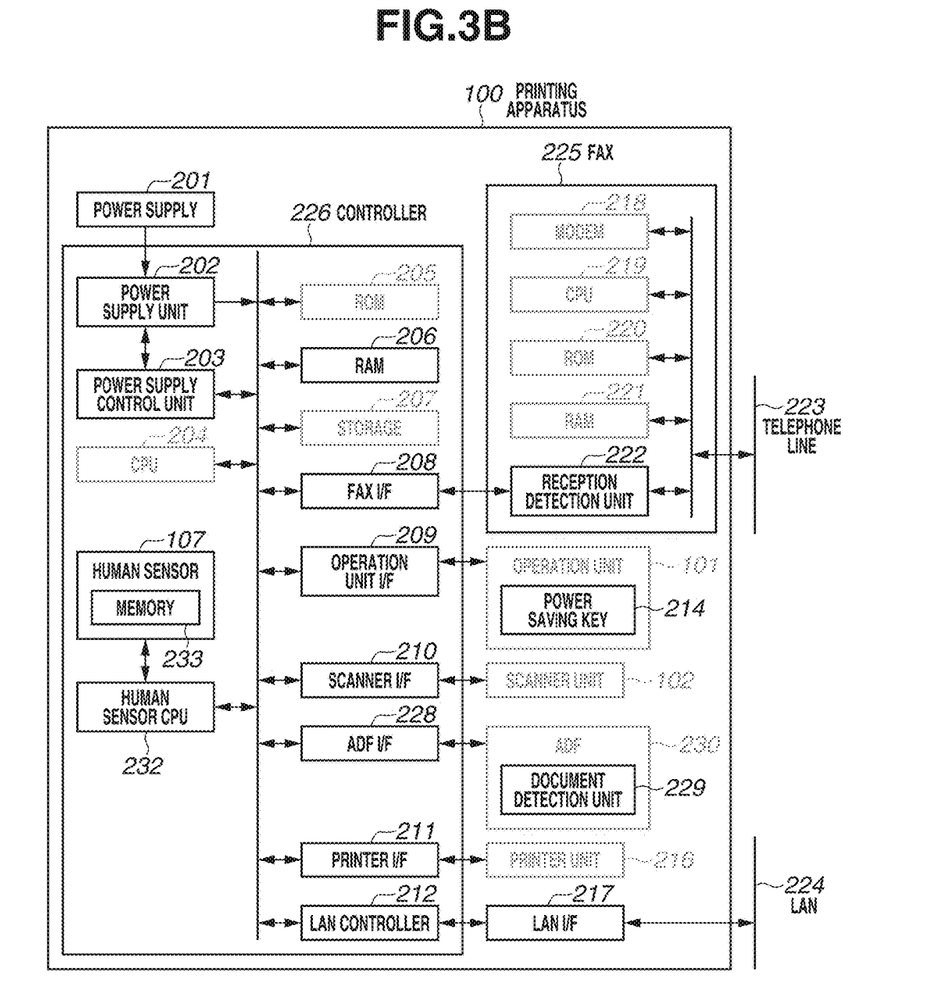

FIGS. 3A and 3B are block diagrams illustrating examples of the hardware configuration of the printing apparatus 100 illustrated in FIGS. 1A and 1B. FIG. 3A illustrates the power state of the printing apparatus 100 in the standby state. FIG. 3B illustrates the power state of the printing apparatus 100 in the power saving state. In FIG. 3B, the supply of power to portions indicated in gray is stopped.

In FIGS. 3A and 3B, a controller 226 is connected to a local area network (LAN) 224 via a LAN interface (I/F) 217. Further, a fax 225 is connected to a telephone line 223.

In the controller 226, a central processing unit (CPU) 204 reads from a read-only memory (ROM) 205 a software program for the controller 226 controlling the entire apparatus, and executes the software program. A random-access memory (RAM) 206 is used to store temporary data when the CPU 204 controls the apparatus. The ROM 205 stores a startup program for the apparatus and various setting values. A storage 207 is a hard disk drive (HDD) or a solid-state drive (SSD), and used to store various types of data.

The operation unit 101 includes an operation liquid crystal panel and hardware keys including the power saving key 214, and receives an instruction input by a user. An operation unit I/F 209 is an interface for connecting the controller 226 and the operation unit 101.

An automatic document feeder (ADF) 230 is a device for, to successively read images of a document by the scanner unit 102, conveying the document to a reading unit of the scanner unit 102. The ADF 230 includes a document detection unit 229 for detecting that a document is placed by the user. The document detection unit 229 is connected to a power supply control unit 203 via an ADF I/F 228. If the document detection unit 229 detects a document in the power saving state, the printing apparatus 100 shifts from the power saving state to the standby state.

The CPU 204 controls the ADF 230 via the ADF I/F 228. The scanner unit 102 reads an image of a document placed on a platen or conveyed from the ADF 230, thereby generating image data. The CPU 204 controls the scanner unit 102 via a scanner I/F 210.

The printer unit 216 prints on a sheet an image based on generated image data or read image data. The CPU 204 controls the printer unit 216 via a printer I/F 211.

The fax 225 includes a modem 218, a CPU 219, a ROM 220, a RAM 221, and a reception detection unit 222. The fax 225 is a facsimile unit for controlling data communication with an external apparatus via the telephone line 223. The modem 218 performs modulation for the transmission and reception by the fax 225. The CPU 219 controls the facsimile transmission and reception by the fax 225 via a fax I/F 208.

The RAM 221 stores temporary data when the CPU 219 controls the fax 225. The ROM 220 stores a startup program for the fax 225 and various setting values. Alternatively, the controller 226 may have the functions of the CPU 219, the RAM 221, and the ROM 220 of the fax 225.

The power supply control unit 203 controls power to the printing apparatus 100. The power supply control unit 203 controls the supply and stop of power to all the components, the power generated by a power supply unit 202, which is connected to a power supply 201.

Figure 5A:
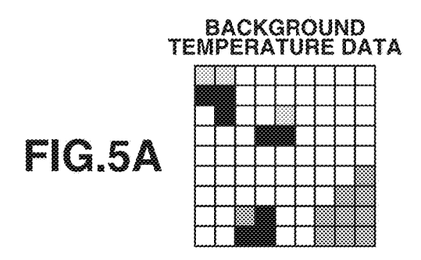
FIGS. 5A, 5B, and 5C are diagrams illustrating detection states of the human sensor.

The human sensor 107 can receive infrared light radiated from an object, and measure the temperature of the object based on the received infrared light. A memory 233 of the human sensor 107 holds background temperature data as illustrated in FIG. 5A to be described below. The background temperature data refers to information indicating the temperature of the environment around the printing apparatus 100. For example, in a case where a fluorescent light and a PC are installed around the printing apparatus 100, the background temperature data includes temperature information of the fluorescent light and the PC. It is desirable that the background temperature data should be acquired when there is no person around the printing apparatus 100. The reason for this is as follows. Suppose that the background temperature data is updated when there is a person around the printing apparatus 100. In such a case, if a change in the response of the human sensor 107 is small even though the person is detected, a heat source that is the person may be erroneously updated as a background temperature. This may hinder the detection of a user after this. The background temperature data is periodically updated. The method for updating the background temperature data will be described below.

Figure 5B:
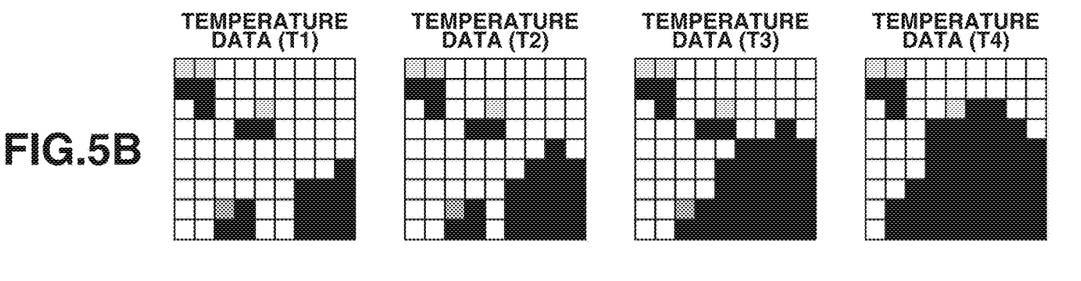

Further, to detect a person approaching the printing apparatus 100, the human sensor 107 acquires the temperature around the printing apparatus 100 at predetermined time intervals as illustrated in FIG. 5B to be described below. Hereinafter, temperature data acquired at a time T is defined as temperature data (T). Previously acquired temperature data is also held in the memory 233 of the human sensor 107. For example, at the timing when temperature data (T2) is acquired, temperature data (T1) is stored in the memory 233.

Based on the background temperature data and the temperature data (T), a human sensor CPU 232 determines whether a person is present around the printing apparatus 100. The details of the determination by the human sensor CPU 232 will be described below. The human sensor CPU 232 reads and executes a program stored in a storage device (not illustrated) (to which power is supplied even in the power saving state) such as a ROM that is provided within the human sensor 107 or the human sensor CPU 232, thereby achieving various types of control.

The above background temperature data needs to be periodically adjusted. This is because the temperature around the printing apparatus 100 always changes due to the opening of a curtain, the turning on of a PC, or the settings of an air conditioner. Thus, without periodically updating the background temperature data, a person approaching the printing apparatus 100 cannot be accurately detected.

The human sensor CPU 232 is connected to the power supply control unit 203. If the human sensor CPU 232 determines that a person approaching the printing apparatus 100 is present, the human sensor CPU 232 transmits to the power supply control unit 203 a signal (a shift instruction signal 504 (see FIG. 4)) for shifting the printing apparatus 100 to the standby state.

In the standby state, power is supplied to all the blocks as illustrated in FIG. 3A. Alternatively, in the standby state, power may be supplied only to necessary functions. For example, the configuration may be such that if a print job for causing the printer unit 216 to perform printing is received via the LAN 224, power is supplied to the printer unit 216, but is not supplied to the scanner unit 102 and the like, which are not used to process the print job.

In the power saving state, power is supplied to some of the blocks as illustrated in FIG. 3B. For example, the supply of power to the portions indicated in gray in FIG. 3B is stopped. First, power is supplied from the power supply 201 to the power supply unit 202. The power subjected to alternating-current to direct-current (AC/DC) conversion by the power supply unit 202 is supplied to the RAM 206, the human sensor 107, the human sensor CPU 232, the fax I/F 208, the reception detection unit 222, the power saving key 214, the operation unit I/F 209, a LAN controller 212, the LAN I/F 217, the document detection unit 229, and the ADF I/F 228.

Figure 4:
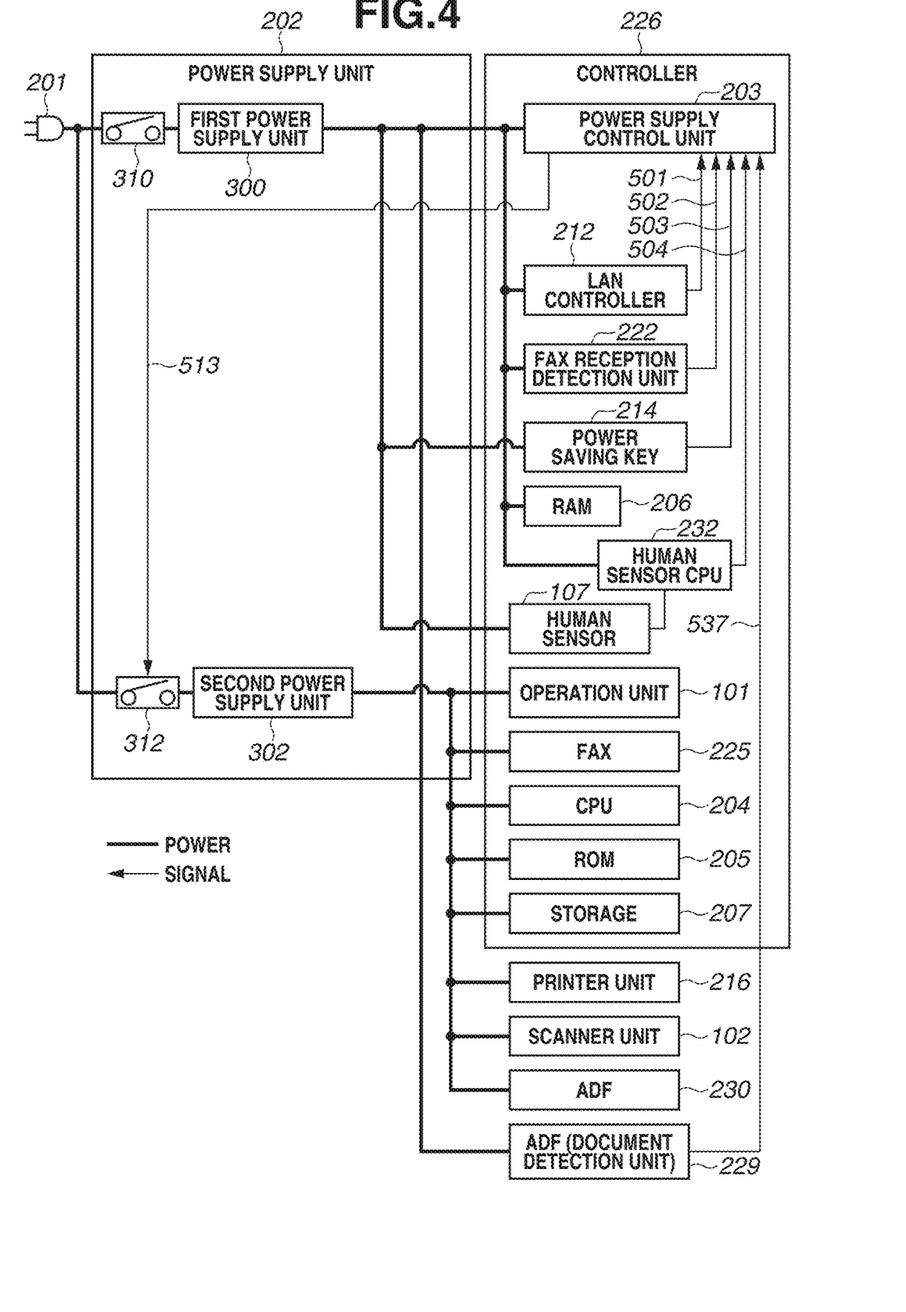
FIG. 4 is a block diagram illustrating a power supply of the printing apparatus.

With reference to FIG. 4, the conditions for shifting to the standby state or the power saving state will be described below.

FIG. 4 is a block diagram illustrating an example of the power supply configuration of the printing apparatus 100.

If the reception detection unit 222 of the fax 225 detects the reception of a facsimile in the power saving state, the reception detection unit 222 transmits a shift instruction signal 502 to the power supply control unit 203 via the fax I/F 208. Consequently, the power supply control unit 203 shifts the printing apparatus 100 to the standby state. Further, if the LAN controller 212 receives a job that requires a shift to the standby state, such as a print job, from the LAN I/F 217 in the power saving state, the LAN controller 212 transmits a shift instruction signal 501 to the power supply control unit 203. Consequently, the power supply control unit 203 shifts the printing apparatus 100 to the standby state.

Further, if the user presses the power saving key 214 in the power saving state, the power saving key 214 transmits a shift instruction signal 503 to the power supply control unit 203 via the operation unit I/F 209. Consequently, the power supply control unit 203 shifts the printing apparatus 100 to the standby state. In the operation unit 101, only the power saving key 214 is illustrated. Alternatively, the configuration may be such that the operation unit 101 recognizes the touch of the user on a touch panel or an operation on another key (to which power is supplied even in the power saving state) provided in the operation unit 101, and transmits the shift instruction signal 503 to the power supply control unit 203.

Further, in the present exemplary embodiment, in the power saving state, if the human sensor CPU 232 determines that a person approaching the printing apparatus 100 is present, the human sensor CPU 232 transmits a shift instruction signal 504 to the power supply control unit 203. Consequently, the power supply control unit 203 shifts the printing apparatus 100 to the standby state.

Next, with reference to FIG. 4, the details of the power supply unit 202 will be described.

Power input from the power supply (plug) 201 is supplied to a first power supply unit 300 via a switch (SW) 310. Further, power input from the power supply (plug) 201 is also supplied to a second power supply unit 302 via an SW 312. The SW 310 is a seesaw switch or a button switch that can be manually turned on by the user. Further, the SW 312 is, for example, a relay switch that changes from an on state to an off state or from the off state to the on state according to a control signal 513 output from the power supply control unit 203.

If the SW 310 is turned on, the power supply control unit 203 transmits the on command signal 513 to the SW 312. Consequently, the printing apparatus 100 shifts to the standby state. The first power supply unit 300, to which power is supplied by turning on the SW 310, supplies power to the blocks that operate in the power saving state. Further, the second power supply unit 302, to which power is supplied by turning on the SW 312 according to the on command signal 513, supplies power to the blocks that operate in the standby state. The first power supply unit 300 generates a direct-current voltage of 5.0 V, for example. Further, the second power supply unit 302 generates a direct-current voltage of 24.0 V, for example.

Next, the description will be given of a case where the power supply control unit 203 receives an instruction for shifting to the standby state (the shift instruction signal 501, 502, 503, or 504, or a shift instruction signal 537).

If the power supply control unit 203 receives at least one of the shift instruction signals (501, 502, 503, 504, and 537) that require a shift to the standby state, the power supply control unit 203 transmits the on command signal 513 to the SW 312. Consequently, the power supply 201 supplies power to the second power supply unit 302. Then, the second power supply unit 302 supplies generated direct-current power to the operation unit 101, the fax 225, the CPU 204, the ROM 205, the storage 207, the printer unit 216, the scanner unit 102, and the ADF 230. As a result, the printing apparatus 100 shifts from the power saving state to the standby state. In the standby state, power is also supplied to the portions to which power is not supplied in the power saving state.

Figure 5C:
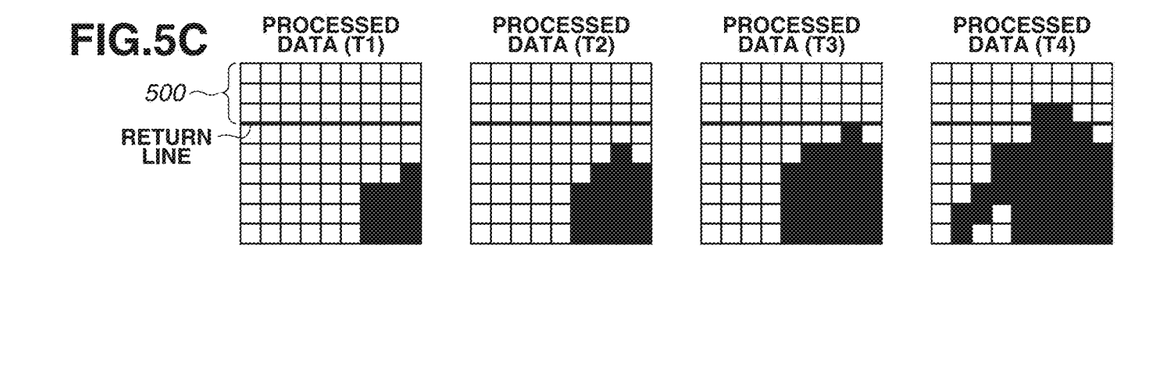

FIGS. 5A, 5B, and 5C are diagrams illustrating the detection states of the human sensor 107.

FIG. 5A is a diagram illustrating background temperature data. The background temperature data indicates the temperature state around the printing apparatus 100. The background temperature data includes, for example, data corresponding to each element of the human sensor 107.

Gray and black portions in the background temperature data illustrated in FIG. 5A indicate heat sources such as a fluorescent light and a PC. It is desirable that the background temperature data should be acquired at the timing when a person is not present around the printing apparatus 100. For example, temperature data acquired at the timing when the operation unit 101 of the printing apparatus 100 is not operated for a predetermined time can be used as the background temperature data. Alternatively, the background temperature data may be acquired by a method for holding and setting background temperature data acquired when the printing apparatus 100 shifts from the power saving state to the standby state, or a method for setting background temperature data acquired when the printing apparatus 100 shifts to the power saving state. In these cases, it is assumed that only data corresponding to an element determined to have detected no person is updated, and data corresponding to an element determined to have detected a person is not updated. In FIGS. 5A, 5B, and 5C, it is assumed that, for example, an element indicated in white has detected a temperature of below 30° C., an element indicated in gray has detected a temperature of 30° C. to 34° C., and an element indicated in black has detected a temperature of 35° C. or above.

FIG. 5B illustrates temperature data acquired at predetermined time intervals (e.g., 0.2-second intervals). The temperature data is acquired at the predetermined time intervals while the printing apparatus 100 is in the power saving state. The human sensor CPU 232 acquires the temperature data from the human sensor 107 at the predetermined time intervals, such as T1, T2, T3, T4, and so on. The temperature data includes, for example, data corresponding to each element of the human sensor 107.

Referring to FIG. 5B, the number of elements having detected a heat source having a temperature equal to or higher than a predetermined temperature increases with the lapse of time. If a person approaches the printing apparatus 100, the number of elements having detected a temperature equal to or higher than the predetermined temperature increases as illustrated in FIG. 5B.

FIG. 5C illustrates processed data calculated from the background temperature data and the temperature data. The processed data is created from the difference between the background temperature data and the temperature data. Specifically, for example, the difference between data corresponding to each element of the human sensor 107 included in the background temperature data and data corresponding to the element of the human sensor 107 included in the temperature data is calculated for each corresponding data. Then, processed data is created based on each piece of difference data calculated as above. In the present exemplary embodiment, the processed data is generated from the difference between the background temperature data and the temperature data. The calculation method, however, is not limited to the difference so long as the processed data is generated based on the background temperature data and the temperature data. Further, to remove noise from each piece of temperature data and each piece of processed data, a filtering process may be performed.

The processed data indicates a heat source other than the heat sources indicated by the background temperature data. Based on this processed data (T), the human sensor CPU 232 determines whether a person approaches the printing apparatus 100.

In the present exemplary embodiment, if an element of the human sensor 107 that is positioned above a return line illustrated in FIG. 5C (i.e., an element placed in an area 500) detects a heat source having a temperature equal to or higher than the predetermined temperature, the human sensor CPU 232 determines that a person approaches the printing apparatus 100. Consequently, the printing apparatus 100 shifts from the power saving state to the standby state.

In processed data (T4), an element of the human sensor 107 that is positioned above the return line detects a heat source having a temperature equal to or higher than the predetermined temperature. Thus, the printing apparatus 100 returns to the standby state at the time T4. In the present exemplary embodiment, if an element positioned above the return line detects a heat source, it is determined that a person approaches the printing apparatus 100. The present invention, however, is not limited to this. Alternatively, for example, if an increase in the number of elements having detected a heat source having a temperature equal to or higher than the predetermined temperature exceeds a predetermined value during a predetermined time, it may be determined that a person approaches the printing apparatus 100. Yet alternatively, another determination method may be employed.

Figure 6:
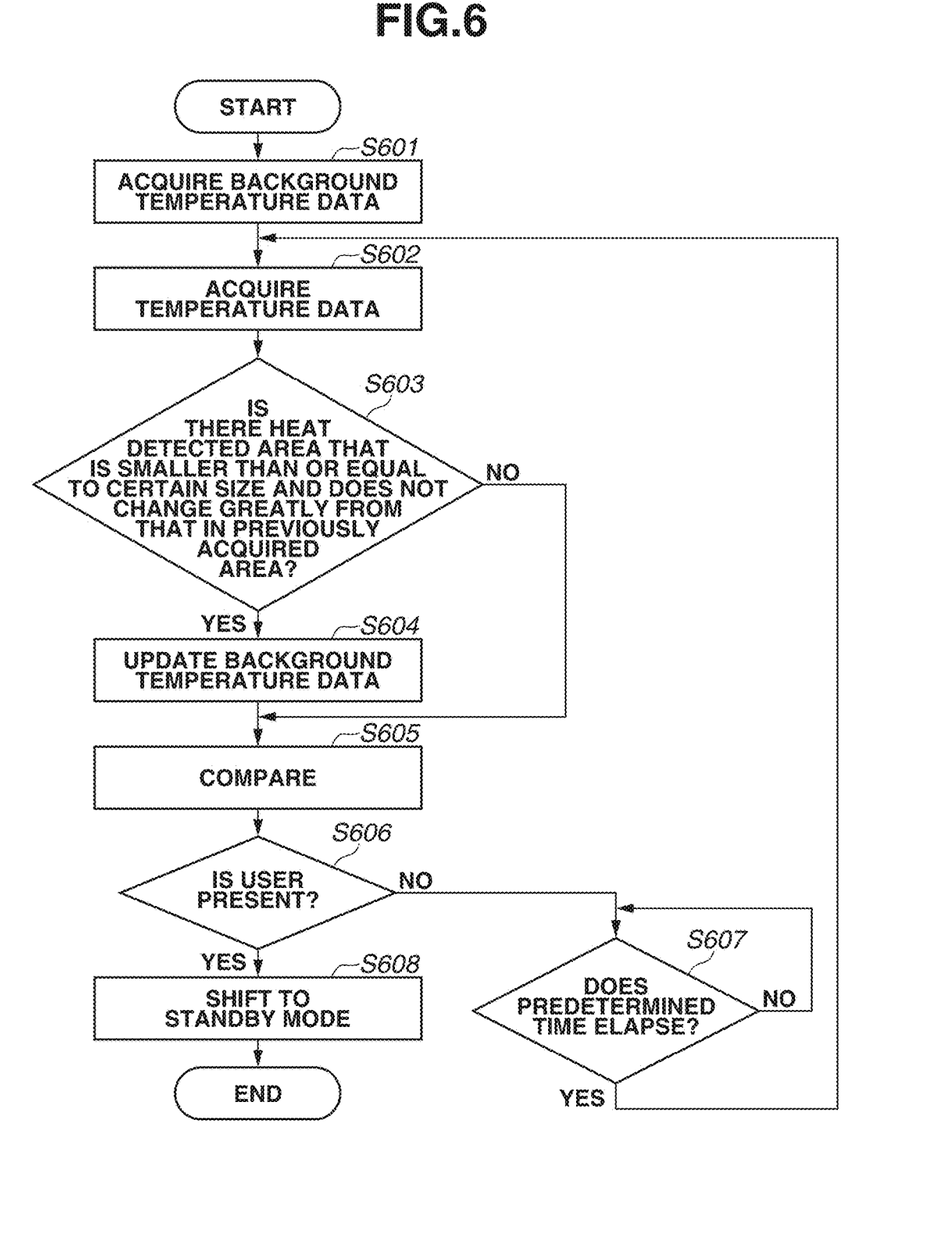
FIG. 6 is a flowchart for updating background temperature data according to a first exemplary embodiment.

FIG. 6 is a flowchart illustrating an example of the process of updating background temperature data according to the first exemplary embodiment. Each step in this flowchart is achieved by the human sensor CPU 232 reading and executing a program stored in a ROM or the like (not illustrated) to which power is supplied in the power saving state.

If the printing apparatus 100 shifts to the power saving state, the human sensor CPU 232 operates as follows. First, in step S601, the human sensor CPU 232 acquires background temperature data from the memory 233. At this time, as described above, as the background temperature data, background temperature data acquired when the printing apparatus 100 shifts to the power saving state may be used, or background temperature data acquired when the printing apparatus 100 shifts to the standby state may be held and used.

Further, in step S602, the human sensor CPU 232 acquires temperature data (T1) from the human sensor 107.

Next, in step S603, the human sensor CPU 232 determines whether in the temperature data acquired in step S602, there is a heat detected area that is smaller than or equal to a certain size and does not change greatly (changes little) from that in previously acquired temperature data. It is assumed that the previously acquired temperature data is held in the memory 233 as described above. If the previously acquired temperature data is not held, the determination in step S603 is No. Particularly, first, the human sensor CPU 232 determines whether a heat detected area is smaller than or equal to the certain size. Then, if the heat detected area is smaller than or equal to the certain size, the human sensor CPU 232 determines whether the heat detected area changes greatly from that in the previously acquired temperature data.

The "certain size" used in the determination in step S603 is set to, for example, four or less elements. However, this does not limit the criterion for the certain size. The heat detected area smaller than or equal to the certain size is compared with that in the previously acquired temperature data for the following purpose. It is highly likely that the heat detected area smaller than or equal to the certain size is an area where heat other than that of a person is detected. Thus, based on the amount of change in the heat detected area smaller than or equal to the certain size, it is determined whether a background temperature is detected or the heat of a person is detected.

If it is determined in step S603 that there is not a heat detected area that is smaller than or equal to the certain size and changes little from that in the previously acquired area (No in step S603), the processing proceeds to step S605. In this case, the human sensor CPU 232 determines that there is no change in temperature caused by an object other than a person (for example, caused by heat generated by another device) around the printing apparatus 100, and a heat source of which the temperature changes results from a person. Then, the human sensor CPU 232 determines that it is not necessary to update the background temperature data.

If, on the other hand, it is determined in step S603 that there is a heat detected area (an area where a heat source having a temperature equal to or higher than the predetermined temperature is detected) that is smaller than or equal to the certain size and changes little from that in the previously acquired area (Yes in step S603), the human sensor CPU 232 determines that there is a change in temperature caused by an object other than a person (for example, caused by heat generated by another device) around the printing apparatus 100. Thus, the human sensor CPU 232 determines that it is necessary to update the background temperature data. Then, the processing proceeds to step S604.

In step S604, the human sensor CPU 232 identifies the heat detected area that is smaller than or equal to the certain size and changes little from that in the previously acquired area. Then, the human sensor CPU 232 updates the background temperature data using data of the identified heat detected area, and the processing proceeds to step S605.

With reference to FIGS. 7A, 7B, 7C, and 7D, the update of the background temperature data will be specifically described.

FIGS. 7A, 7B, 7C, and 7D are diagrams illustrating in detail the criterion for the determination in step S603 in FIG. 6, and the process of updating the background temperature data in step S604 in FIG. 6. The description will be given here of the process of setting four or less elements as the criterion and determining the amount of change. The present invention, however, is not limited to this.

Figure 7A:
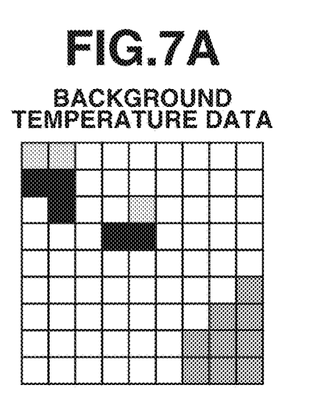
FIGS. 7A, 7B, 7C, and 7D are diagrams illustrating detection states of the human sensor for updating a background temperature according to the first exemplary embodiment.

FIG. 7A illustrates the initial background temperature data acquired in step S601 in FIG. 6.

Figure 7B:
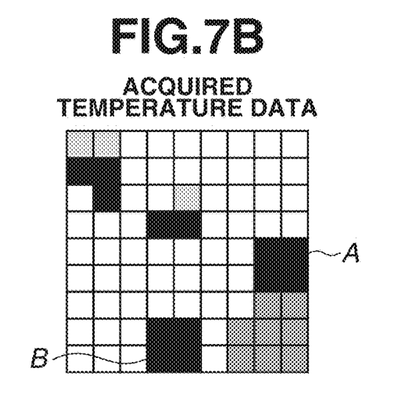

Further, FIG. 7B illustrates an example of the temperature data acquired in step S602 in FIG. 6.

Figure 7C:
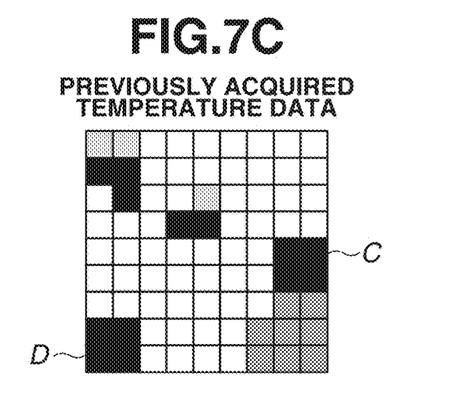

Further, FIG. 7C illustrates an example of the previously acquired temperature data.

In step S603 in FIG. 6, based on the difference between the temperature data acquired in step S602 (e.g., FIG. 7B) and the previously acquired temperature data (e.g., FIG. 7C), the human sensor CPU 232 determines whether areas A and B, which are determined to have a high temperature (a temperature equal to or higher than the predetermined temperature) in the temperature data acquired in step S602, are a person.

As illustrated in FIG. 7C, in the previously acquired temperature data, areas C and D, which are determined to have a high temperature (a temperature equal to or higher than the predetermined temperature), are detected.

The area A in FIG. 7B and the area C in FIG. 7C are at the same position, and the amount of change is small. Thus, the human sensor CPU 232 determines that a heat source detected in the area A is not a person. Then, the human sensor CPU 232 updates the background temperature data using data corresponding to the area A.

Further, the area B in FIG. 7B and the area D in FIG. 7C are away from each other (are at different positions), and the amount of change is large. Thus, the human sensor CPU 232 determines that a heat source detected in the area B is a person. Then, the human sensor CPU 232 does not update the background temperature data using data corresponding to the area B.

Figure 7D:
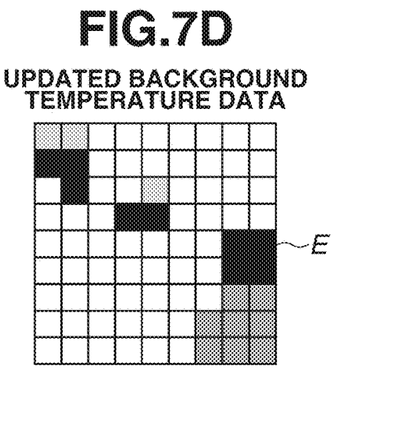

The human sensor CPU 232 makes such a determination to update the background temperature data and sets the updated background temperature data as background temperature data as illustrated in FIG. 7D.

It is desirable that the criterion that "the amount of change is not large (the amount of change is small)" for use in the determination should use, for example, the conditions that half or more of one heat detected area overlaps half or more of the other heat detected area, that a change in the size of the heat detected area is less than or equal to two elements, and that the heat detected areas are connected together. The determination method, however, is not limited to these.

The description returns to the flowchart in FIG. 6 below.

In step S605, the human sensor CPU 232 compares the background temperature data with the temperature data acquired in step S602, thereby generating processed data. Specifically, the human sensor CPU 232 calculates the difference between the background temperature data and the temperature data, thereby generating processed data. For example, the human sensor CPU 232 generates processed data (T1) from the background temperature data and the temperature data (T1).

Next, in step S606, based on the processed data generated in step S605, the human sensor CPU 232 determines whether a user of the printing apparatus 100 is present. For example, the human sensor CPU 232 makes the determination based on the criterion for the determination as illustrated in FIG. 5C.

If it is determined that a user is not present (No in step S606), the processing proceeds to step S607. In step S607, the human sensor CPU 232 waits until a predetermined time (e.g., 0.2 seconds) elapses. After the lapse of the predetermined time, the processing returns to step S602, in which the human sensor CPU 232 acquires next temperature data. It is assumed that before the processing proceeds to step S602, the temperature data acquired in step S602 is saved as previously acquired temperature data in the memory 233. As described above, the human sensor CPU 232 continues to acquire temperature data at the predetermined intervals during the power saving state.

If, on the other hand, the human sensor CPU 232 determines in step S606 that a user of the printing apparatus 100 is present (Yes in step S606), then in step S608, the human sensor CPU 232 shifts the printing apparatus 100 to the standby state. For example, as a result of repeating the acquisition of temperature data, if the human sensor CPU 232 determines that a person approaching the printing apparatus 100 is present as in the processed data (T4) in FIG. 5C, then in step S608, the printing apparatus 100 shifts to the standby state. In step S608, specifically, the human sensor CPU 232 transmits the shift instruction signal 504 to the power supply control unit 203, and the power supply control unit 203 having received the transmitted shift instruction signal 504 turns on the SW 312, thereby shifting the printing apparatus 100 to the standby state.

As described above, to accurately detect the approach of a person, a background temperature is set, and based on the size of heat and a change in the position of the heat in temperature data acquired by a human sensor, it is determined whether the heat is an approaching person. Thus, the update of the background temperature is controlled.

In step S603, the description has been given of a configuration in which, if in the temperature data acquired in step S602, there is a heat detected area that is smaller than or equal to the certain size and does not change greatly (changes little) from that in the previously acquired temperature data, the background temperature data is partially updated using data of the heat detected area. The present invention, however, also includes a configuration in which, for example, if in the temperature data acquired in step S602, there is not a heat detected area that is smaller than or equal to the certain size and changes greatly from the previously acquired temperature data, all the background temperature data is updated using the temperature data acquired in step S602.

As described above, according to the first exemplary embodiment, background temperature data is appropriately updated based on a change over time in a heat detected area being smaller than or equal to a certain size and having a temperature equal to or higher than a predetermined temperature that is identified from temperature data acquired by the human sensor 107. Thus, it becomes possible to appropriately detect the approach of a person so as to avoid erroneous detection. As a result, it becomes possible to reduce erroneous detection caused by a temperature generated around the printing apparatus 100 and detect the approach of a person to the printing apparatus 100 more accurately than a conventional method. As a result, it becomes possible to suppress the reduction in the convenience of a user and the reduction in power saving based on erroneous detection, and improve convenience and power saving.

In a second exemplary embodiment of the present invention, an overview of the differences from the first exemplary embodiment will be described.

In the first exemplary embodiment, the description has been given of a configuration in which attention is paid to a heat detected area that is detected by the human sensor 107 and is smaller than or equal to a certain size, and background temperature data is updated based on a change in the heat detected area. In the second exemplary embodiment, the description will be given of a configuration in which attention is paid to a heat detected area outside a particular area, and background temperature data is updated based on a change in the heat detected area.

Figure 8:
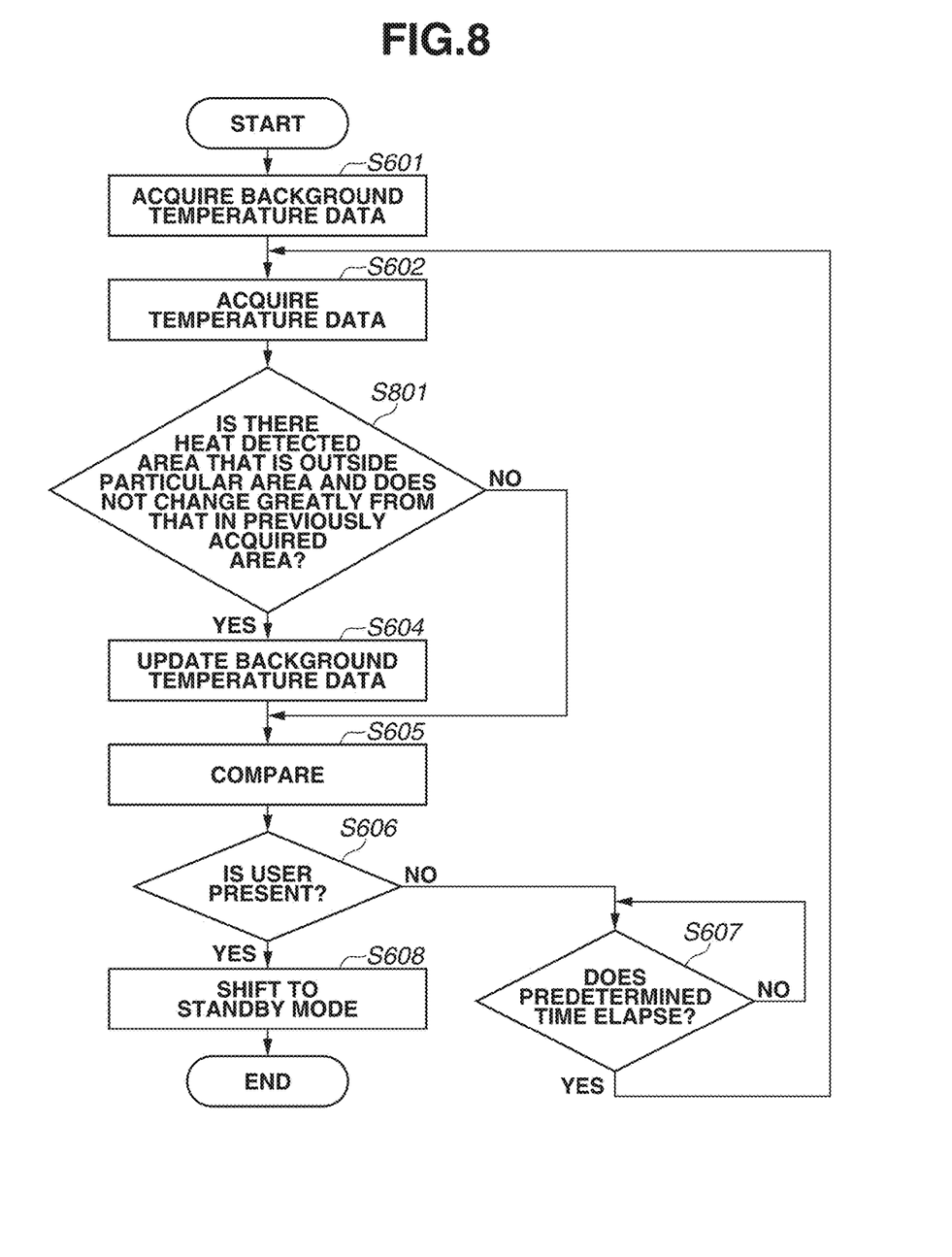
FIG. 8 is a flowchart for updating background temperature data according to a second exemplary embodiment.

FIG. 8 is a flowchart illustrating an example of the process of updating background temperature data according to the second exemplary embodiment. Each step in this flowchart is achieved by the human sensor CPU 232 reading and executing a program stored in a ROM or the like (not illustrated) to which power is supplied in the power saving state. Steps similar to those in FIG. 6 are designated by the same step numbers.

If the printing apparatus 100 shifts to the power saving state, the human sensor CPU 232 operates as follows. In FIG. 8, only the differences from FIG. 6 will be described.

Figure 9A:
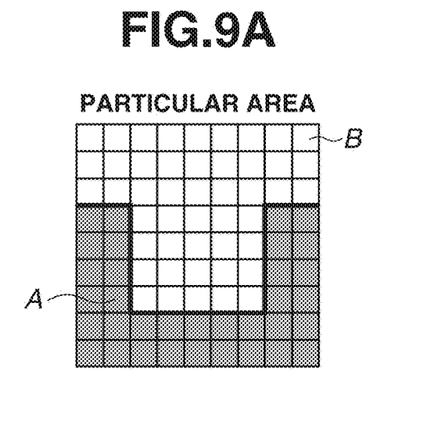
FIGS. 9A, 9B, 9C, 9D, and 9E are diagrams illustrating detection states of a human sensor for updating a background temperature according to the second exemplary embodiment.

In the processing illustrated in FIG. 8, after the process of step S602, the processing proceeds to step S801. In step S801, the human sensor CPU 232 determines whether in the temperature data acquired in step S602, there is a heat detected area that is generated outside a particular area and does not change greatly (changes little) from that in previously acquired temperature data. It is assumed that if the previously acquired temperature data is not held, the determination in step S801 is No. Particularly, first, the human sensor CPU 232 determines whether a heat detected area is generated in the particular area. Then, if the heat detected area is generated outside the particular area, the human sensor CPU 232 determines whether the heat detected area changes greatly from that in the previously acquired temperature data. The "particular area" used in the determination in step S801 is illustrated in FIG. 9A.

If it is determined in step S801 that there is not a heat detected area that is generated outside the particular area and changes little from that in the previously acquired area (No in step S801), the processing proceeds to step S605. In this case, the human sensor CPU 232 determines that there is no change in temperature caused by an object other than a person (for example, caused by heat generated by another device) around the printing apparatus 100, and a heat source of which the temperature changes results from a person. Then, the human sensor CPU 232 determines that it is not necessary to update the background temperature data.

If, on the other hand, it is determined in step S801 that there is a heat detected area that is generated outside the particular area and changes little from that in the previously acquired area (Yes in step S801), the human sensor CPU 232 determines that there is a change in temperature caused by an object other than a person (for example, caused by heat generated by another device) around the printing apparatus 100. Thus, the human sensor CPU 232 determines that it is necessary to update the background temperature data. Then, the processing proceeds to step S604.

In step S604, the human sensor CPU 232 identifies the heat detected area that is generated outside the particular area and changes little from that in the previously acquired area. Then, the human sensor CPU 232 updates the background temperature data using data of the identified heat detected area, and the processing proceeds to step S605. The processes of step S605 and thereafter are similar to those in the first exemplary embodiment (FIG. 6) and therefore will not be described here.

With reference to FIGS. 9A, 9B, 9C, 9D, and 9E, the update of the background temperature data in the second exemplary embodiment will be specifically described.

FIGS. 9A, 9B, 9C, 9D, and 9E are diagrams illustrating in detail the criterion for the determination in step S801 in FIG. 8 and the process of updating the background temperature data in step S604 in FIG. 8.

FIG. 9A illustrates the particular area in step S801 in FIG. 8. The description is given here of the process of setting an area A illustrated in FIG. 9A, as a human heat detection area (corresponding to the particular area in step S801 in FIG. 8), setting an area B as a heat detection area of an object other than a person, and determining the amount of change. The present invention, however, is not limited to this. The area outside the particular area is compared with that in the previously acquired temperature data for the following purpose. It is highly likely that the heat detected area present outside the particular area is an area where heat other than that of a person is detected. Thus, based on the amount of change in the heat detected area present outside the particular area, it is determined whether a background temperature is detected or the heat of a person is detected.

Figure 9B:
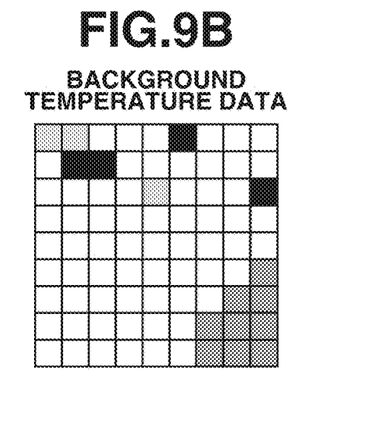

FIG. 9B illustrates the initial background temperature data acquired in step S601 in FIG. 8.

Figure 9C:
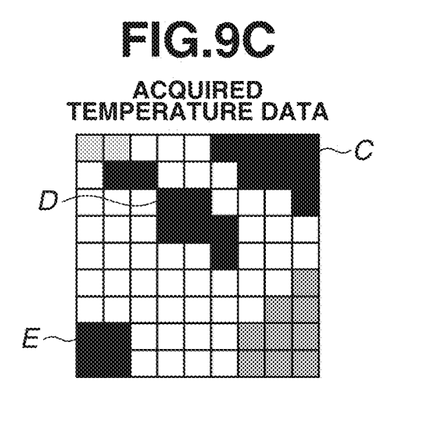

Further, FIG. 9C illustrates an example of the temperature data acquired in step S602 in FIG. 8.

Figure 9D:
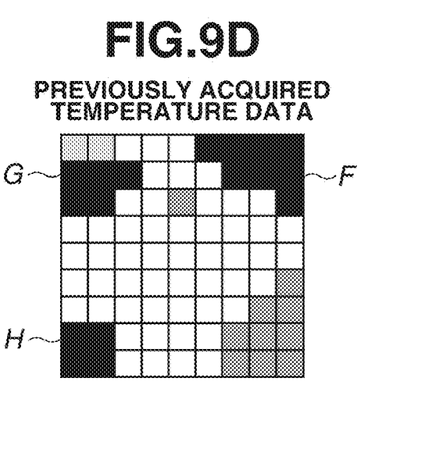

Further, FIG. 9D illustrates an example of the previously acquired temperature data.

In step S801 in FIG. 8, based on the difference between the temperature data acquired in step S602 (e.g., FIG. 9C) and the previously acquired temperature data (e.g., FIG. 9D), the human sensor CPU 232 determines whether areas C, D, and E, which are determined to have a high temperature (a temperature equal to or higher than the predetermined temperature) in the temperature data acquired in step S602, are a person.

As illustrated in FIG. 9D, in the previously acquired temperature data, areas F, G, and H, which are determined to have a high temperature (a temperature equal to or higher than the predetermined temperature), are detected.

The area C in FIG. 9C is in the area B in FIG. 9A (i.e., outside the particular area) and at the same position as the area F in FIG. 9D, and the amount of change is small. Thus, the human sensor CPU 232 determines that a heat source detected in the area C is not a person. Then, the human sensor CPU 232 updates the background temperature data using data corresponding to the area C.

Further, the area D in FIG. 9C is in the area B in FIG. 9A (i.e., outside the particular area) but is away from the area G in FIG. 9D, and the amount of change is large. Thus, the human sensor CPU 232 determines that a heat source detected in the area D is a person. Then, the human sensor CPU 232 does not update the background temperature data using data corresponding to the area D.

Further, the area E in FIG. 9C is at the same position as the area H in FIG. 9D, and the amount of change is small. The area E, however, is in the area A in FIG. 9A (i.e., the particular area). Thus, the human sensor CPU 232 determines that a heat source detected in the area E, for example, is a person. Then, the human sensor CPU 232 does not update the background temperature data using data corresponding to the area E.

Figure 9E:
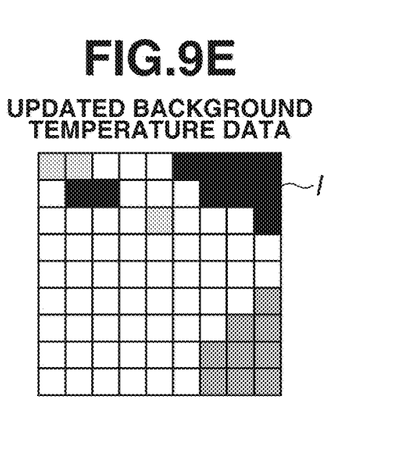

The human sensor CPU 232 makes such a determination to update the background temperature data and sets the updated background temperature data as background temperature data as illustrated in FIG. 9E.

It is desirable that the criterion that "the amount of change is not large (the amount of change is small)" for use in the determination should use, for example, the conditions that half or more of one heat detected area overlaps half or more of the other heat detected area, that a change in the size of the heat detected area is less than or equal to two elements, and that the heat detected areas are connected together. The determination method, however, is not limited to these.

In step S801, the description has been given of a configuration in which, if in the temperature data acquired in step S602, there is a heat detected area that is generated outside the particular area and does not change greatly (changes little) from that in the previously acquired temperature data, the background temperature data is partially updated using data of the heat detected area. The present invention, however, also includes a configuration in which, for example, if in the temperature data acquired in step S602, there is not a heat detected area that is generated outside the particular area and changes greatly from that in the previously acquired temperature data, all the background temperature data is updated using the temperature data acquired in step S602.

As described above, according to the second exemplary embodiment, background temperature data is appropriately updated based on a change over time in a heat detected area being outside a particular area and having a temperature equal to or higher than a predetermined temperature that is identified from temperature data acquired by the human sensor 107. Thus, it becomes possible to appropriately detect the approach of a person so as to avoid erroneous detection. As a result, it becomes possible to reduce erroneous detection caused by a temperature generated around the printing apparatus 100 and detect the approach of a person to the printing apparatus 100 more accurately than a conventional method. As a result, it becomes possible to suppress the reduction in the convenience of a user and the reduction in power saving based on erroneous detection, and improve convenience and power saving.

In the above exemplary embodiments, the description has been given of an example where the present invention is applied to a printing apparatus. The present invention, however, is also applicable to various apparatuses other than a printing apparatus, such as a personal computer, an air conditioner, and a television.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-166680, filed Aug. 19, 2014, which is hereby incorporated by reference herein in its entirety.

What is claimed is:

1. A printing apparatus having a first power state and a second power state in which power consumption is lower than power consumption in the first power state, the printing apparatus comprising:
   a human sensor which includes a plurality of elements, each of the plurality of elements outputting a signal corresponding to a temperature;
   a storage which stores background temperature data including a plurality of temperature values; and
   a controller which determines whether the printing apparatus shifts from the second power state to the first power state, based on the background temperature data and the plurality of signals output from the human sensor,
   wherein the controller selects one or more signals among the plurality of signals output from the human sensor based on a comparison between the plurality of temperature values of the background temperature data and the plurality of signals output from the human sensor, and updates at least one of the plurality of temperature values of the background temperature data using the selected one or more signals, wherein the controller does not use the other signals to update the plurality of temperature values of the background temperature data.

2. The printing apparatus according to claim 1, wherein the controller determines, based on the background temperature data and the plurality of signals from the human sensor, whether a human is present around the printing apparatus,
   wherein, based on a determination that a human is not present around the printing apparatus, the controller updates the at least one of the plurality of temperature values of the background temperature data.

3. The printing apparatus according to claim 2, wherein the controller determines that a human is present around the printing apparatus based on a difference between the background temperature data and the plurality of signals.

4. The printing apparatus according to claim 1, wherein the each of the plurality of elements receive infrared light.

5. The printing apparatus according to claim 1, wherein the each of the plurality of elements output infrared light and receive a reflected wave of the output infrared light.

6. The printing apparatus according to claim 1, wherein the plurality of elements are arranged in a grid or on a line.

7. The printing apparatus according to claim 1,
wherein the controller receives a first plurality of signals from the human sensor at a first timing and a second plurality of signals from the human sensor at a second timing, and
wherein, based on at least a difference between the first plurality of signals and the background temperature data and the second plurality of signals and the background temperature data updated using the at least one of the first plurality of signals, the controller determines whether the printing apparatus shifts from the second power state to the first power state.

8. The printing apparatus according to claim 1, wherein the controller updates the at least one of the plurality of temperature values of the background temperature data periodically.

9. The printing apparatus according to claim 1, further comprising: an operation panel which receives user operation,
wherein the controller updates the at least one of the plurality of temperature values of the background temperature data when a predetermined time has elapsed without receiving any user operation.

10. The printing apparatus according to claim 1, further comprising: a printer which prints an image on a sheet.

11. A method for controlling a printing apparatus having a first power state and a second power state in which power consumption is lower than power consumption in the first power state, the method comprising:
outputting a signal corresponding to a temperature by a human sensor including a plurality of elements performing the outputting;
storing background temperature data including a plurality of temperature values;
determining whether the printing apparatus shifts from the second power state to the first power state, based on the background temperature data and the plurality of signals output from the human sensor; and
selecting one or more signals among the plurality of signals output from the human sensor based on a comparison between the plurality of temperature values of the background temperature data and the plurality of signals output from the human sensor, and updating at least one of the plurality of temperature values of the background temperature data using the selected one or more signals, wherein the other signals are not used to update the plurality of temperature values of the background temperature data.

12. The method according to claim 11, determining, based on the background temperature data and the plurality of signals from the human sensor, whether a human is present around the printing apparatus, and
updating, when it is determined that a human is not present around the printing apparatus, the at least one of the plurality of temperature values of the background temperature data.

13. The method according to claim 12, wherein it is determined that a human is present around the printing apparatus based on a difference between the background temperature data and the plurality of signals.

14. The method according to claim 11, wherein the each of the plurality of elements receive infrared light.

15. The method according to claim 11, wherein each of the plurality of elements output infrared light and receive a reflected wave of the output infrared light.

16. The method according to claim 11, wherein the plurality of elements are arranged in a grid or on a line.

17. A non-transitory recording medium recording a program for causing a printing apparatus having a first power state and a second power state in which power consumption is lower than power consumption in the first power state, to function as:
a human sensor which includes a plurality of elements, each of the plurality of elements outputting a signal corresponding to a temperature;
a storage which stores background temperature data including a plurality of temperature values; and
a controller which determines whether the printing apparatus shifts from the second power state to the first power state, based on the background temperature data and the plurality of signals output from the human sensor,
wherein the controller selects one or more signals among the plurality of signals output from the human sensor based on a comparison between the plurality of temperature values of the background temperature data and the plurality of signals output from the human sensor, and updates at least one of the plurality of temperature values of the background temperature data using the selected one or more signals, wherein the controller does not use the other signals to update the plurality of temperature values of the background temperature data.

* * * * *